United States Patent
Kitai

(10) Patent No.: US 11,208,089 B2
(45) Date of Patent: Dec. 28, 2021

(54) DRIVE-FORCE CONTROL APPARATUS FOR VEHICLE

(71) Applicant: TOYOTA JIDOSHA KABUSHIKI KAISHA, Toyota (JP)

(72) Inventor: Shinya Kitai, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/106,944

(22) Filed: Nov. 30, 2020

(65) Prior Publication Data
US 2021/0162978 A1 Jun. 3, 2021

(30) Foreign Application Priority Data
Dec. 3, 2019 (JP) .............................. JP2019-218990

(51) Int. Cl.
*B60W 30/02* (2012.01)
*B60W 10/16* (2012.01)

(52) U.S. Cl.
CPC ............ *B60W 10/16* (2013.01); *B60W 30/02* (2013.01); *B60W 2552/05* (2020.02); *B60W 2710/083* (2013.01); *B60W 2710/12* (2013.01); *B60W 2720/406* (2013.01)

(58) Field of Classification Search
CPC ...... B60W 10/06; B60W 10/08; B60W 10/16; B60W 30/02; B60W 30/184; B60W 30/188; B60W 30/20; B60W 2552/05; B60W 2552/20; B60W 2552/35; B60W 2710/083; B60W 2710/12; B60W 2720/406; B60W 20/10; B60W 20/12; B60W 20/17
See application file for complete search history.

(56) References Cited

U.S. PATENT DOCUMENTS

| | | | |
|---|---|---|---|
| 2007/0187158 A1* | 8/2007 | Muta | B60K 28/16 180/65.1 |
| 2013/0316871 A1* | 11/2013 | Shiiba | B60W 10/115 477/15 |
| 2016/0207521 A1* | 7/2016 | Ogawa | B60W 50/0097 |
| 2016/0221568 A1* | 8/2016 | Ogawa | B60W 10/08 |
| 2017/0001628 A1* | 1/2017 | Itagaki | F16D 41/125 |

FOREIGN PATENT DOCUMENTS

| | | |
|---|---|---|
| JP | 2008-072868 A | 3/2008 |
| JP | 2019-001366 A | 1/2019 |
| JP | 2019-055718 A | 4/2019 |

* cited by examiner

*Primary Examiner* — Edwin A Young
(74) *Attorney, Agent, or Firm* — Oliff PLC

(57) ABSTRACT

A drive-force control apparatus for a vehicle including a first drive apparatus for driving a first pair of wheels and a second drive apparatus for driving a second pair of wheels. Each of the first pair of wheels is one of front and rear wheels of the vehicle, and each of the second pair of wheels is the other of the front and rear wheels. During running of the vehicle on a wave-like road, the control apparatus reduces a drive-force share ratio of one of the first and second drive apparatuses, and to increases a drive-force share ratio of the other of the first and second drive apparatuses, wherein the one of the first and second drive apparatuses includes a weakest part that is to be damaged the most easily among parts composing the first and second drive apparatuses, by resonance caused by the running on the wave-like road.

6 Claims, 4 Drawing Sheets

DRIVE-FORCE CONTROL APPARATUS FOR VEHICLE

This application claims priority from Japanese Patent Application No. 2019-218990 filed on Dec. 3, 2019, the disclosure of which is herein incorporated by reference in its entirety.

FIELD OF THE INVENTION

The present invention relates to a drive-force control apparatus for a vehicle, and particularly, to such a drive-force control apparatus that is configured to limit a drive force during running of the vehicle in a wave-like road.

BACKGROUND OF THE INVENTION

There is a tendency that resonance could be generated in a body of a vehicle during running of the vehicle on a wave-like road. In view of such a tendency, there is proposed a control apparatus for a motor drive vehicle (see JP-2008-72868A). In the proposed control apparatus, a change amount of a rotational speed of a motor is detected based on a rotational angle of the motor, and whether the resonance is generated or not is determined based on the change amount of the motor rotational speed. When it is determined that the resonance is generated, a drive torque of the motor is reduced. In this arrangement, input of an excessively large torque from wheel axles to a drive system is detected in advance, and the motor and other parts can be protected by limiting the drive torque of the motor. As techniques for detecting running of the vehicle on the wave-like road, there are proposed various methods such as a method for detecting the running on the wave-like road, based on variation component of wheel speed (see JP-2019-55718A). On the other hand, JP2019-1366A proposes a vehicle of front/rear wheel independent drive type that includes a first drive apparatus, a second drive apparatus, a first pair of wheels and a second pair of wheels, wherein the first drive apparatus includes at least one first motor and is configured to drive the first pair of wheels by the at least one first motor through a first drive-force transmission path defined in the first drive apparatus, and wherein the second drive apparatus includes at least one second motor and is configured to drive the second pair of wheels by the at least one second motor through a second drive-force transmission path, and wherein each of the first pair of wheels is one of front and rear wheels of the vehicle, and each of the second pair of wheels is the other of the front and rear wheels. In such a vehicle of front/rear wheel independent drive type, too, it is possible to protect component parts, by detecting running of the vehicle on the wave-like road and then limiting drive forces of the first and second drive apparatuses.

SUMMARY OF THE INVENTION

However, the limitation of the drive force or forces could reduce running performance of the vehicle during the running on the wave-like road.

The present invention was made in view of the background art described above. It is therefore an object of the present invention to protect component parts by limiting a drive force and to suppress reduction of running performance of a vehicle caused by the limitation of the drive force, in case of detection of running of the vehicle on a wave-like road.

The above-described object is achieved according to the following aspects of the present invention.

According to a first aspect of the invention, there is provided a drive-force control apparatus for a vehicle of front/rear wheel independent drive type that includes a first drive apparatus, a second drive apparatus, a first pair of wheels and a second pair of wheels, wherein the first drive apparatus includes at least one first motor and is configured to drive the first pair of wheels by the at least one first motor through a first drive-force transmission path defined in the first drive apparatus, and wherein the second drive apparatus includes at least one second motor and is configured to drive the second pair of wheels by the at least one second motor through a second drive-force transmission path defined in the second drive apparatus, each of the first pair of wheels being one of front and rear wheels of the vehicle, each of the second pair of wheels being the other of the front and rear wheels, the drive-force control apparatus comprising: a wave-like-road running detection portion configured to detect running of the vehicle on a wave-like road (that may be referred also to as "wavy road"); and a share-ratio change portion configured, when the running of the vehicle on the wave-like road is detected by the wave-like-road running detection portion, to reduce a drive-force share ratio of one of the first and second drive apparatuses, and to increase a drive-force share ratio of the other of the first and second drive apparatuses, the one of the first and second drive apparatuses including a weakest part that is to be damaged the most easily among parts composing the first and second drive apparatuses, by resonance caused by the running of the vehicle on the wave-like road.

The above-described term "weakest part that is to be damaged the most easily" is interpreted to mean "weakest part that is to be either mechanically or electrically damaged the most easily". Whether the weakest part is damaged or not is determined by taking account of a compressive set of factors such as reduction of a durability of the weakest part.

It is noted that the above-described drive-force share ratio of the one of the first and second drive apparatuses is interpreted to mean a ratio of a drive force of the one of the first and second drive apparatuses to a total drive force that is a sum of drive forces of the first and second drive apparatuses, and that the above-described drive-force share ratio of the other of the first and second drive apparatuses is interpreted to mean a ratio of a drive force of the other of the first and second drive apparatuses to the total drive force.

According to a second aspect of the invention, in the drive-force control apparatus according to the first aspect of the invention, the share-ratio change portion is configured, when changing the drive-force share ratio of the first drive apparatus, to change a torque of the at least one first motor included in the first drive apparatus, and is configured, when changing the drive-force share ratio of the second drive apparatus, to change a torque of the at least one second motor included in the second drive apparatus.

According to a third aspect of the invention, in the drive-force control apparatus according to the first or second aspect of the invention, the share-ratio change portion is configured, when increasing the drive-force share ratio of the other of the first and second drive apparatuses, to limit increase of the drive-force share ratio of the other of the first and second drive apparatuses, such that damage of a weakest part that is to be damaged the most easily among parts composing the other of the first and second drive apparatuses, by the resonance, is suppressed.

According to a fourth aspect of the invention, in the drive-force control apparatus according to any one of the first through third aspects of the invention, the at least one first motor of the first drive apparatus includes an engine, wherein the first drive-force transmission path includes a part constituted by a first transaxle that is configured to distribute an output of the engine to right and left wheels as the first pair of wheels, wherein the at least one second motor of the second drive apparatus consists of an electric motor, and wherein the second drive-force transmission path includes a part constituted by a second transaxle that is configured to distribute an output of the electric motor to right and left wheels as the second pair of wheels.

According to a fifth aspect of the invention, in the drive-force control apparatus according to the fourth aspect of the invention, the at least one first motor of the first drive apparatus includes an electric motor in addition to the engine, wherein the first transaxle is configured to distribute, to the right and left wheels, an output of the electric motor in addition to the output of the engine.

According to a sixth aspect of the invention, in the drive-force control apparatus according to the first through third aspects of the invention, the at least one first motor of the first drive apparatus consists of an electric motor, wherein the first drive-force transmission path includes a part constituted by a first transaxle that is configured to distribute an output of the electric motor to right and left wheels as the first pair of wheels, wherein the at least one second motor of the second drive apparatus consists of an electric motor, and wherein the second drive-force transmission path includes a part constituted by a second transaxle that is configured to distribute an output of the electric motor to right and left wheels as the second pair of wheels.

In the drive-force control apparatus according to the present invention, when the running of the vehicle on the wave-like road is detected, the drive-force share ratio of the one of the first and second drive apparatuses is reduced while the drive-force share ratio of the other of the first and second drive apparatuses is increased, wherein the one of the first and second drive apparatuses includes a weakest part that is to be damaged the most easily among parts composing the first and second drive apparatuses, by resonance caused by the running of the vehicle on the wave-like road. Therefore, the reduction of the drive force of the one of the first and second drive apparatuses makes it possible to suppress damage of the weakest part which could be caused by input of an excessively large torque due to the resonance, while the increase of the drive force of the other of the first and second drive apparatuses makes it possible to suppress reduction of the total drive force acting on an entirety of the vehicle, so that it is possible to improve running performance of the vehicle when the vehicle runs on the wave-like road.

In the drive-force control apparatus according to the second aspect of the invention, the torque of the at least one first motor included in the first drive apparatus is changed when the drive-force share ratio of the first drive apparatus is to be changed, and the torque of the at least one second motor included in the second drive apparatus when the drive-force share ratio of the second drive apparatus is to be changed. Therefore, not only where the weakest part is constituted by the first drive-force transmission path or second drive-force transmission path but also where the weakest part is constituted by the at least one first motor or at least one second motor, the damage of the weakest part can be appropriately suppressed.

In the drive-force control apparatus according to the third aspect of the invention, when the drive-force share ratio of the other of the first and second drive apparatuses is to be increased, the increase of the drive-force share ratio of the other of the first and second drive apparatuses is limited, such that damage of a weakest part that is to be damaged the most easily among parts composing the other of the first and second drive apparatuses, by the resonance, is suppressed. Owing to this arrangement, it is possible to suppress the damage of the weakest part of the other of the first and second drive apparatuses, while improving the running performance of the vehicle during the running on the wave-like road, by suppressing the reduction of the total drive force acting on an entirety of the vehicle by the increase of the drive-force share ratio of the other of the first and second drive apparatuses.

In the drive-force control apparatus according to the fourth aspect of the invention, the at least one first motor of the first drive apparatus includes the engine whose output is to be distributed by the first transaxle to the right and left wheels, while the at least one second motor of the second drive apparatus consists of the electric motor whose output is to be distributed by the second transaxle to the right and left wheels. The present invention is advantageously applied to this arrangement.

In the drive-force control apparatus according to the fifth aspect of the invention, the at least one first motor of the first drive apparatus includes the electric motor in addition to the engine, and the output of the electric motor as well as the output of the engine is distributed by the first transaxle to the right and left wheels. The present invention is advantageously applied to this arrangement.

In the drive-force control apparatus according to the sixth aspect of the invention, the at least one first motor of the first drive apparatus consists of the electric motor whose output is to be distributed by the first transaxle to the right and left wheels, while the at least one second motor of the second drive apparatus consists of the electric motor whose output is to be distributed by the second transaxle to the right and left wheels. That is, the drive-force control apparatus according to the sixth aspect of the invention is applied to a motor drive vehicle such as an electric car, a fuel cell vehicle and a series-type hybrid vehicle in which the electric motor or motors are to be operated by an electricity generated by an electric generator driven by an engine.

DETAILED DESCRIPTION OF PREFERRED EMBODIMENTS

Figure 1:
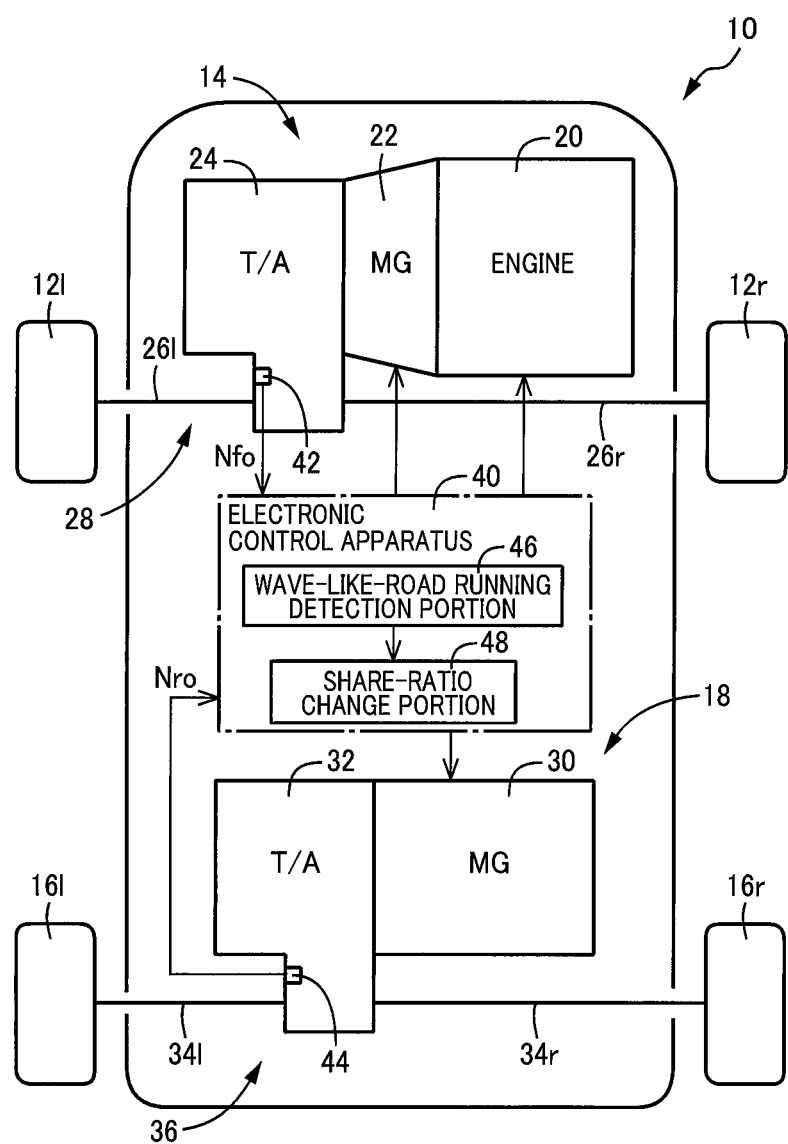
FIG. 1 is a view schematically showing a construction of a four-wheel drive system of a vehicle, to which the present invention is applied.

The vehicle of front/rear wheel independent drive type, to which the present invention is applied, is a vehicle in which the front-wheel-side drive force and the rear-wheel-side drive force can be controlled independently of each other in accordance with the respective drive-force share ratios, and may be caused to run always in a four-wheel drive state with the front and rear wheels being driven, or may be caused to run normally in a two-wheel drive state with only the front wheels or the rear wheels being driven and to run in the four-wheel drive state, as needed, for example, upon start of running of the vehicle and/or upon occurrence of slipping of the wheel or wheels. The at least one first motor and the at least one second motor preferably include the engine and the electric motor. The at least one first motor and the at least one second motor may include both of the engine and the electric motor, or may include a plurality of electric motors. The engine is an internal combustion engine that is configured to generate a drive force by combustion of a fuel. The electric motor is preferably a motor generator that can be used also as an electric generator. The electric motor is to be operated by an electricity generated by an electric storage device such as a battery. However, the electric motor may be operated also by an electricity obtained by a fuel cell, an electricity generated by an electric generator driven by an engine, or an electricity obtained by another electric generator.

Each of the first drive-force transmission path and the second drive-force transmission path is constituted by, for example, right and left drive shafts and a transaxle configured to distribute an output of a motor to the right and left wheels. However, each of the first drive-force transmission path and the second drive-force transmission path may be constituted to include a final speed reducer and/or a propeller shaft configured to transmit the output of the motor in a longitudinal direction of the vehicle. The transaxle may include, in addition to a differential device configured to distribute the output of the motor to the right and left wheels, for example, a speed reducer or speed increaser (such as a transmission gear mechanism, a step-variable transmission, a continuously variable transmission and an electrically-controlled continuously-variable transmission) and a clutch or the like configured to cut off a drive force transmission and to control a transmission torque.

The wave-like-road running detection portion may be configured to make a determination as to whether the vehicle is running on the wave-like road or not, based on a periodic fluctuation of a rotational speed and/or a torque of the motor such as the electric motor, and/or a periodic fluctuation of a rotational speed of a rotary member such as an output rotational speed and a wheel speed. Further, the determination as to whether the vehicle is running on the wave-like road or not can be made in any one of various manners such as a manner depending on vertical vibration of a suspension device.

The weakest part, which is likely to be damaged the most easily by the resonance caused by the running of the vehicle on the wave-like road, is dependent on constructions of the first and second drive apparatuses, and may be determined, for example, through experimentation, various damage data or the like. The weakest part is, for example, a shaft, a gear and a frictional engagement portion or other part that is involved in transmission of the drive force. The term "damage" is interpreted to encompass not only a mechanical damage but also an electrical damage, and encompass even reduction of a durability of the part. Further, the weakest part may be the at least one first motor or the at least one second motor. The above-described one of the first and second drive apparatuses including the weakest part may be a predetermined one of the first and second drive apparatuses. However, the one of the first and second drive apparatuses could be changed from one of the first and second drive apparatuses to the other of the first and second drive apparatuses, for example, when the drive-force share ratios of the respective first and second drive apparatuses are changed depending on a running state or a running condition of the vehicle. In such a case, the one of the first and second drive apparatuses including the weakest part, namely, the one of the first and second drive apparatuses whose drive-force share ratio is to be reduced, may be determined depending on the drive-force share ratios upon detection of the running on the wave-like road.

The share-ratio change portion may be configured to change the drive-force share ratios, for example, by increasing and reducing the torques of the at least one first motor and the at least one second motor. However, where each of the first drive-force transmission path and the second drive-force transmission path is provided with a clutch or the like whose transmission torque is controllable, it is possible to change the drive-force share ratios by controlling the transmission torque. It is preferable that the share-ratio change portion reduces the drive-force share ratio of the one of the first and second drive apparatuses, and increases the drive-force share ratio of the other of the first and second drive apparatuses, by an amount equal to an amount by which the drive-force share ratio of the one of the first and second drive apparatuses is reduced, such that the total drive force that is the sum of drive forces of the first and second drive apparatuses is not changed. However, the increase of the drive-force share ratio of the other of the first and second drive apparatuses may be limited by taking account of factors such as strength of each of parts composing the other of the first and second drive apparatuses. For example, it is possible to limit the amount of the increase of the drive-force share ratio of the other of the first and second drive apparatuses or to set an upper limit of the drive force of the other of the first and second drive apparatuses, such that damage of the weakest part that is to be damaged the most easily among the parts composing the other of the first and second drive apparatuses, by the running on the wave-like road, is suppressed.

EMBODIMENTS

Hereinafter, there will be described some embodiments of the present invention, with reference to drawings.

FIG. 1 is a view schematically showing a construction of a vehicle 10 including a drive-force control apparatus that is an embodiment of the present invention. The vehicle 10 is a four-wheel drive vehicle of front/rear wheel independent drive type, and includes a first drive apparatus 14, a second drive apparatus 18, a first pair of wheels in the form of front right and left wheels 12r, 12l (hereinafter simply referred to as "front wheels 12" unless they are to be distinguished from each other) and a second pair of wheels in the form of rear right and left wheels 16r, 16l (hereinafter simply referred to as "rear wheels 16" unless they are to be distinguished from each other). The first and second drive apparatuses 14, 18 are provided independently of each other, and are configured to drive the front wheels 12 and the rear wheels 16, respectively.

The first drive apparatus 14 includes at least one first motor in the form of an engine 20 and a motor generator (MG) 22, and a first transaxle (T/A) 24 that is configured to distribute outputs of the engine 20 and the motor generator 22 to the front right and left wheels 12r, 12l as the first pair of wheels through a pair of drive shafts 26r, 26l. The first transaxle 24 includes a differential device (such as a differential gear mechanism) configured to distribute the outputs of the engine 20 and the motor generator 22 to right and left sides, and optionally includes a speed reducer or increaser such as a transmission gear mechanism, a step variable transmission and a continuously variable transmission, as needed. The first transaxle 24 cooperates with the pair of drive shafts 26r, 26l, to constitute a first drive-force transmission path 28 that is defined in the first drive apparatus 14. The engine 20 is an internal combustion engine such as gasoline engine and diesel engine, which is configured to generate a drive force by combustion of a fuel. The motor generator 22 serves as an electric motor and an electric generator, and is disposed in, for example, a drive-force transmission path between the engine 20 and the first transaxle 24, so as to apply a power running torque and a regenerative torque to the drive-force transmission path. The motor generator 22 is connected to an electric storage device such as a battery through an inverter, so as to generate the power running torque based on an electricity of the electric storage device and charge the electric storage device with an electricity obtained by the regenerative torque. Between the engine 20 and the motor generator 22, a connection/disconnection device such as a clutch is provided, as needed, to connect and disconnect the engine 20 to and from the drive-force transmission path.

The second drive apparatus 18 includes at least one second motor in the form of a motor generator (MG) 30, and a second transaxle (T/A) 32 that is configured to distribute output of the motor generator 30 to the rear right and left wheels 16r, 16l as the second pair of wheels through a pair of drive shafts 34r, 34l. In the present embodiment, the at least one second motor consists of only the motor generator 30. The second transaxle 32 includes a differential device (such as a differential gear mechanism) configured to distribute the output of the motor generator 30 to right and left sides, and optionally includes a speed reducer or increaser such as a transmission gear mechanism, as needed. The second transaxle 32 cooperates with the pair of drive shafts 34r, 34l, to constitute a second drive-force transmission path 36 that is defined in the second drive apparatus 18. The motor generator 30 serves as an electric motor and an electric generator, and is connected to, for example, an input shaft of the second transaxle 32, so as to apply a power running torque and a regenerative torque to the second transaxle 32. Like the motor generator 22, the motor generator 30 is connected to an electric storage device such as a battery through an inverter, so as to generate the power running torque based on an electricity of the electric storage device and charge the electric storage device with an electricity obtained by the regenerative torque. It is noted that the electric storage device connected to the motor generator 30 on a side of the rear wheels 16 and the electric storage device connected to the motor generator 22 on a side of the front wheels 12 may be the same electric storage device that is common to the motor generators 22, 30.

The vehicle 10 includes an electronic control apparatus 40 serving as a drive-force control apparatus. The electronic control apparatus 40 includes a so-called microcomputer incorporating a CPU, a ROM, a RAM and an input-output interface. The CPU performs control operations such as a drive-force control operation for the front and rear wheels 12, 16, by processing various input signals, according to control programs stored in the ROM, while utilizing a temporary data storage function of the RAM. The electronic control apparatus 40 receives various signals representing information that is required to execute the drive-force control operation for the front and rear wheels 12, 16. As the various signals supplied to the electronic control apparatus 40, for example, there are a signal supplied from a front-wheel-side output-rotational speed sensor 42 and a signal supplied from a rear-wheel-side output-rotational speed sensor 44. The signal supplied from the front-wheel-side output-rotational speed sensor 42 represents a front-wheel-side output rotational speed Nfo that is an output rotational speed of the first drive apparatus 14. The signal supplied from the rear-wheel-side output-rotational speed sensor 44 represents a rear-wheel-side output rotational speed Nro that is an output rotational speed of the second drive apparatus 18. The front-wheel-side output rotational speed Nfo corresponds to an average of rotational speeds of the respective front wheels 12r, 12l. The rear-wheel-side output rotational speed Nro corresponds to an average of rotational speeds of the respective rear wheels 16r, 16l. A lower one of the front-wheel-side output rotational speed Nfo and the rear-wheel-side output rotational speed Nro corresponds to a vehicle running speed V of the vehicle 10. As the various signals supplied to the electronic control apparatus 40, there are further a signal supplied from an acceleration-operation amount sensor (not shown) and representing an operation amount θacc of an accelerator pedal (not shown), signals supplied from respective rotational speed sensors (not shown) and representing rotational speeds of the engine 20 and the motor generators 22, 30 that are detected by the respective rotational speed sensors, and a signal supplied from, for example, a road slope sensor and representing a road surface gradient Φ for executing a drive-force distribution control operation for the front and rear wheels 12, 16.

Figure 3:
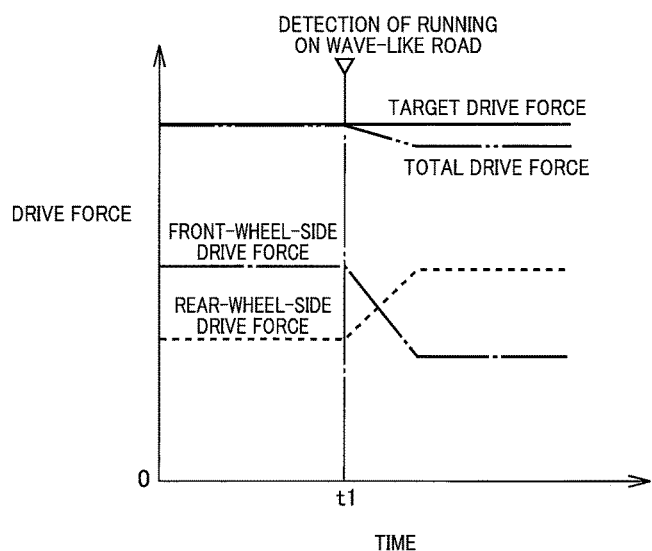
FIG. 3 is a time chart showing, by way of example, a case in which drive-force share ratios for front and rear wheels of the vehicle are changed by execution of the drive-force distribution control operation shown in the flow chart of FIG. 2.

The electronic control apparatus 40 calculates a target drive force, depending on, for example, a target running speed of the vehicle 10 and the operation amount θacc of the accelerator pedal, and divides the target drive force into a front-wheel-side drive force and a rear-wheel-side drive force, depending on drive-force share ratios for the front and rear wheels 12, 16. Then, the electronic control apparatus 40 controls torques of the engine 20 and the motor generator 22 of the first drive apparatus 14 for obtaining the front-wheel-side drive force, and controls a torque of the motor generator 30 of the second drive apparatus 18 for obtaining the rear-wheel-side drive force. Each of the drive-force share ratios for the front and rear wheels 12, 16 may be either a constant value that is predetermined depending on, for example, a ratio between loads applied to the front wheels 12 and the rear wheels 16, or a variable value that varies depending on a running state of the vehicle 10 (for example, whether the vehicle 10 is accelerating, for example, upon start of running, or is running at a normal speed, and/or a running condition of the vehicle 10 such as the road surface gradient Φ. Further, the drive-force share ratios may be changed depending on, for example, slip rates of the front and rear wheels 12, 16. FIG. 3 is a time chart showing, by way of example, a relationship among the target drive force (solid line), the front-wheel-side drive force (one-dot chain line) and the rear-wheel-side drive force (broken line). In the example shown in FIG. 3, in a stage earlier than a time point μl, the drive-force share ratio for the front wheels 12 is kept at a substantially constant value that is about 60%, while the drive-force share ratio for the rear wheels 16 is kept at a substantially constant value that is about 40%, so that a total drive force (two-dot chain line), i.e., a sum of the front-wheel-side drive force and the rear-wheel-side drive force, is substantially equal to the target drive force (solid line). It is noted that the vehicle 10 may be normally placed in a two-wheel drive state with only the front wheels 12 or the rear wheels 16 being driven, and may be placed in a four-wheel drive state, as needed, for example, upon start of running of the vehicle 10 and/or upon occurrence of slipping of the wheel or wheels.

Figure 2:
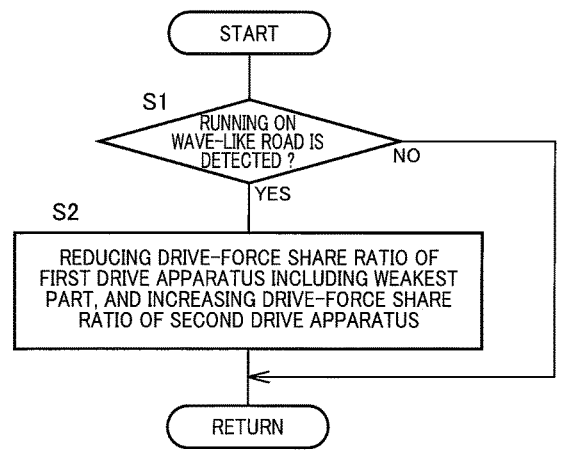
FIG. 2 is a flow chart for specifically explaining a drive-force distribution control operation, which is to be executed by an electronic control apparatus provided in the vehicle of FIG. 1, during running of the vehicle on a wave-like road.

The electronic control apparatus 40 functionally includes a wave-like-road running detection portion 46 and a share-ratio change portion 48, and executes signal processing in accordance with a control routine shown in the flow chart of FIG. 2, namely, implements steps S1 and S2 of the control routine, so as to appropriately change the drive-force share ratios for the front and rear wheels 12, 16 during running of the vehicle 10 on the wave-like road. The steps S1 and S2 of the control routine correspond to functions of the wave-like-road running detection portion 46 and the share-ratio change portion 48, respectively.

The control routine shown in the flow chart of FIG. 2 is initiated with the step S1 that is implemented to determine whether running of the vehicle 10 on the wave-like road, which could cause the resonance, is detected or not. When the running of the vehicle 10 on the wave-like road is detected, the step S2 is implemented. When the running of the vehicle 10 on the wave-like road is not detected, one cycle of execution of the control routine is terminated. When the vehicle 10 is running on the wave-like road, the rotational speeds of the front wheels 12 and/or the rear wheels 16 are fluctuated or changed by bounces of the front and rear wheels 12, 16 due to unevenness of the road surface. Therefore, it is possible to determine whether the vehicle 10 is running on the wave-like road causing the resonance, for example, by seeing a fluctuation amount and/or a fluctuation cycle of the rotational speed of each of the front-wheel-side output rotational speed Nfo and the rear-wheel-side output rotational speed Nro. Further, the determination as to whether the vehicle 10 is running on the wave-like road can be made in any one of various manners such as a manner depending on a fluctuation of the rotational speed of each of the wheels 12, 16, a manner depending on a fluctuation of the rotational speed of each of the engine 20 and the motor generators 22, 30 and a manner depending on a fluctuation of the torque of each of the engine 20 and the motor generators 22, 30.

At the step S2, which is implemented when the running of the vehicle 10 on the wave-like road is detected, the drive-force share ratio of one of the first and second drive apparatuses 14, 18 is reduced while the drive-force share ratio of the other of the first and second drive apparatuses 14, 18 is increased, wherein the one of the first and second drive apparatuses 14, 18 includes a weakest part that is to be damaged the most easily among parts composing the first and second drive apparatuses 14, 18, by the resonance caused by the running of the vehicle 10 on the wave-like road. The above-described one of the first and second drive apparatuses 14, 18 including the weakest part is predetermined, for example, through experimentation, various damage data or the like. In the present embodiment, the above-described one of the first and second drive apparatuses 14, 18 including the weakest part is the first drive apparatus 14, and the weakest part is, for example, each of the drive shafts 26*r*, 26*l*. For reducing the drive-force share ratio of the first drive apparatus 14 as the above-described one of the first and second drive apparatuses 14, 18, the torque of the engine 20 and/or the torque of the motor generator 22 of the first drive apparatus 14 is reduced. For increasing the drive-force share ratio of the second drive apparatus 18 as the other of the first and second drive apparatuses 14, 18, the torque of the motor generator 30 of the second drive apparatus 18 is increased. These increase and reduction are made in gradual manners such that the drive forces for the front and rear wheels 12, 16 are not quickly changed. There is a possibility that the one of the first and second drive apparatuses 14, 18 including the weakest part could be changed from the first drive apparatus 14 to the second drive apparatus 18, for example, depending on the drive-force share ratios for the front and rear wheels 12, 16. In such a case, the one of the first and second drive apparatuses 14, 18 including the weakest part, namely, the one of the first and second drive apparatuses 14, 18 whose drive-force share ratio is to be reduced, may be determined depending on the drive-force share ratios upon detection of the running on the wave-like road.

An amount of the reduction of the drive-force share ratio of the first drive apparatus 14 may be a predetermined constant amount. However, the amount of the reduction of the drive-force share ratio of the first drive apparatus 14 may be a value that varies, for example, in accordance with a predetermined map or the like, based on the fluctuation amount of the rotational speed of each of the front-wheel-side output rotational speed Nfo and the rear-wheel-side output rotational speed Nro (which are used for the above-described determination as to whether the vehicle 10 is running on the wave-like road causing the resonance or not), such that the amount of the reduction of the drive-force share ratio of the first drive apparatus 14 is increased with increase of the fluctuation amount of the rotational speed. Further, it is also possible to determine an amount of reduction of the drive force of the first drive apparatus 14, in place of determining the amount of the reduction of the drive-force share ratio of the first drive apparatus 14. On the other hand, an amount of the increase of the drive-force share ratio of the second drive apparatus 18 is preferably the same as the amount of the reduction of the drive-force share ratio of the first drive apparatus 14 so that a total drive force as a sum of the drive forces of the first and second drive apparatuses 14, 18 remains unchanged. Thus, in the present embodiment, the amount of the increase of the drive-force share ratio of the second drive apparatus 18 is substantially equal to the amount of the reduction of the drive-force share ratio of the first drive apparatus 14. However, there is a possibility that the increase of the drive-force share ratio of the second drive apparatus 18 could cause a component part of the second drive apparatus 18 to be damaged by the running on the wave-like road. In view of such a possibility, it is also possible to limit the amount of the increase of the drive-force share ratio of the second drive apparatus 18 or set an upper limit of the drive force of the second drive apparatus 18, such that damage of a weakest part that is to be damaged the most easily among parts composing the second drive apparatus 18, by the running on the wave-like road, is suppressed. Where the weakest part of the second drive apparatus 18 is each of the drive shafts 34*r*, 34*l*, for example, it is possible to limit the amount of the increase of the drive-force share ratio of the second drive apparatus 18 or set an upper limit of the drive force of the second drive apparatus 18, such that the drive shafts 34*r*, 34*l* are not damaged.

In the example shown in the time chart of FIG. 3, the time point μl is a point of time at which the running on the wave-like road is detected at the step S1, and the front-wheel-side drive force of the first drive apparatus 14 and the rear-wheel-side drive force of the second drive apparatus 18 are reduced and increased, respectively, by implementation of the step S2. Further, in the example shown in the time chart of FIG. 3, the amount of the increase of the drive-force share ratio of the second drive apparatus 18 or the drive force as such of the second drive apparatus 18 is limited, so that the increase of the rear-wheel-side drive force is limited whereby the total drive force as the sum of the front-wheel-side drive force and the rear-wheel-side drive force is made smaller than the target drive force.

As described above, in the drive-force distribution control operation executed by the electronic control apparatus 40 of the vehicle 10 according to the present embodiment, when the running of the vehicle 10 on the wave-like road is detected, the drive-force share ratio of the first drive apparatus 14 including the weakest part (for example, each of the drive shafts 26r, 26l) that is to be damaged the most easily by the resonance caused by the running on the wave-like road is reduced while the drive-force share ratio of the second drive apparatus 18 is increased. Therefore, the reduction of the drive force of the first drive apparatus 14 makes it possible to suppress the damage of the weakest part which could be caused by input of an excessively large torque due to the resonance, while the increase of the drive force of the second drive apparatus 18 makes it possible to suppress reduction of the total drive force acting on an entirety of the vehicle 10, so that it is possible to improve running performance of the vehicle 10 during the running on the wave-like road.

Further, the torque of the engine 20 and/or the torque of the motor generator 22 of the first drive apparatus 14 is reduced while the torque of the motor generator 30 of the second drive apparatus 18 is increased. Therefore, the damage of the weakest part can be appropriately suppressed not only where the weakest part is constituted by the first drive-force transmission path 28 or second drive-force transmission path 36 but also where the weakest part is constituted by the engine 20, motor generator 22 or motor generator 30.

Further, the increase of the drive-force share ratio of the second drive apparatus 18 is limited such that damage of the weakest part (for example, each of the drive shafts 34r, 34l) of the second drive apparatus 18 is suppressed. Owing to this arrangement, it is possible to suppress the damage of the weakest part of the second drive apparatus 18, while improving the running performance of the vehicle 10 during the running on the wave-like road, by suppressing the reduction of the total drive force acting on an entirety of the vehicle 10 by the increase of the drive-force share ratio of the second drive apparatus 18.

There will be next described other embodiments of the present invention. The same reference signs as used in the above-described embodiment will be used in the following embodiments, to identify the functionally corresponding elements, and descriptions thereof are not provided.

Figure 4:
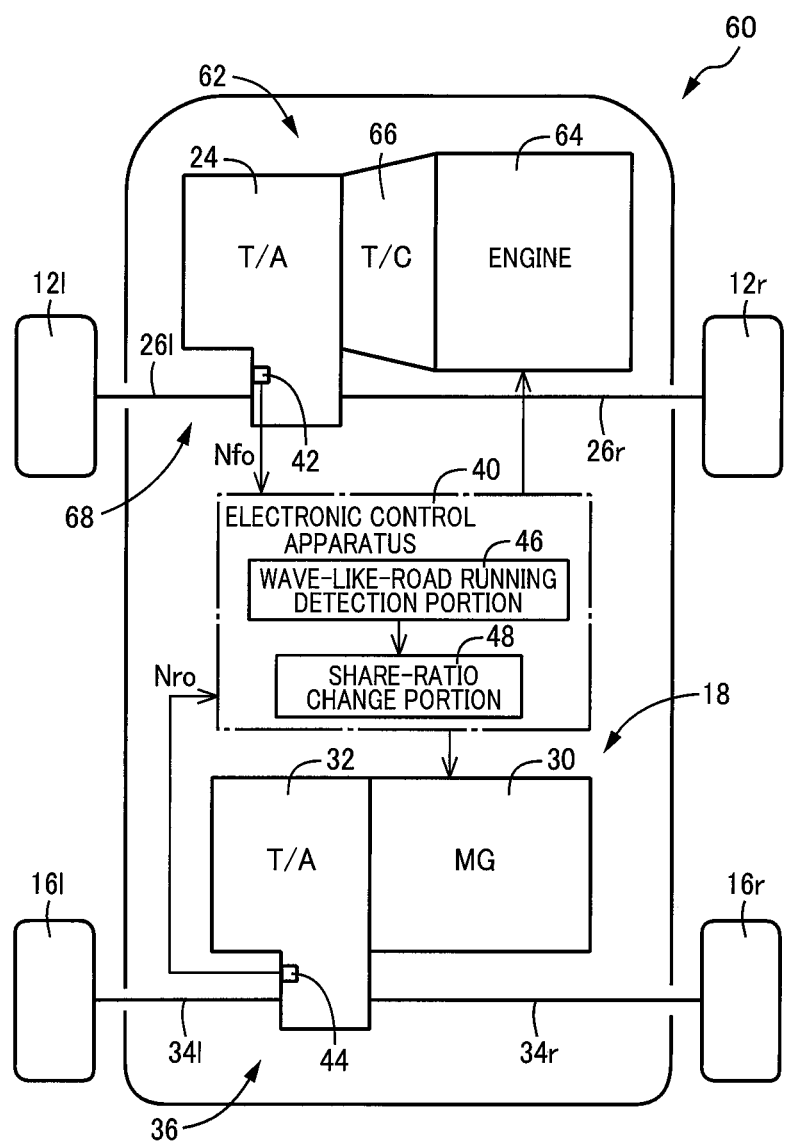
FIG. 4 is a view schematically showing a construction of a four-wheel drive system of another vehicle, to which the present invention is advantageously applied.
Figure 5:
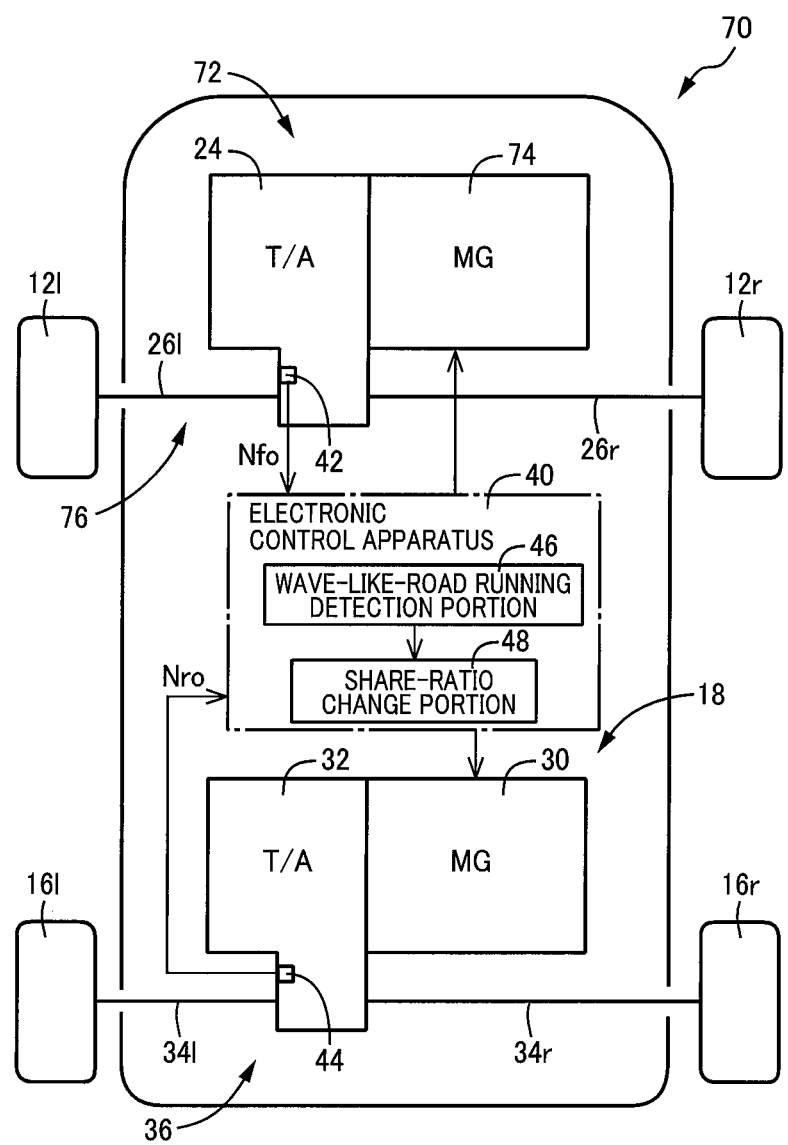
FIG. 5 is a view schematically showing a construction of a four-wheel drive system of still another vehicle, to which the present invention is advantageously applied.

FIG. 4 and FIG. 5 show vehicles 60, 70 of front/rear wheel independent drive type, each of which is other than the above-described vehicle 10 and to each of which the present invention is applied. The vehicle 60 is different from the vehicle 10 in terms of a first drive apparatus 62 configured to drive the front wheels 12, and is the same as the vehicle 10 in terms of the second drive apparatus 18 configured to drive the rear wheels 16. The at least one first motor of the first drive apparatus 62 consists of only an engine 64, and an output of the engine 64 is transmitted to the first transaxle 24 through a torque converter (T/C) 66 having a lockup clutch. The output of the engine 64 is eventually transmitted to the front right and left wheels 12r, 12l through the drive shafts 26r, 26l. The torque converter 66, first transaxle 24 and drive shafts 26r, 26l cooperate with one another to constitute a first drive-force transmission path 68. In this embodiment, too, substantially the same effects as those of the above-described embodiment can be obtained by executing the drive-force distribution control operation by the electronic control apparatus 40, during the running on the wave-like road, in accordance with the control routine shown in the flow chart of FIG. 2.

The vehicle 70 is different from the vehicle 10 in terms of a first drive apparatus 72 configured to drive the front wheels 12, and is the same as the vehicle 10 in terms of the second drive apparatus 18 configured to drive the rear wheels 16. The at least one first motor of the first drive apparatus 72 consists of only a motor generator 74, and an output of the motor generator 74 is transmitted to the front right and left wheels 12r, 12l through the first transaxle 24. The first transaxle 24 and drive shafts 26r, 26l cooperate with one another to constitute a first drive-force transmission path 76. The motor generator 74 serves as an electric motor and an electric generator, and is connected to the input shaft of the first transaxle 24, so as to apply a power running torque and a regenerative torque to the first transaxle 24. The motor generator 74 is connected to an electric storage device such as a battery through an inverter, so as to generate the power running torque based on an electricity of the electric storage device and charge the electric storage device with an electricity obtained by the regenerative torque. That is, this vehicle 70 is an electric vehicle, which is caused to run with the front and rear wheels 12, 16 being driven by the motor generators 74, 30 that is operated by only the electricity of the electric storage device or devices. In this embodiment, too, substantially the same effects as those of the above-described embodiments can be obtained by executing the drive-force distribution control operation during the running on the wave-like road by the electronic control apparatus 40, in accordance with the control routine shown in the flow chart of FIG. 2.

It is noted that the vehicle 70 of FIG. 5 may be constituted by a fuel cell vehicle in which the electric storage device is to be charged by a fuel cell, or may be constituted by a series-type hybrid vehicle in which the electric storage device is to be charged with an electricity generated by an electric generator driven by an engine.

Further, in any of the above-described embodiments, each of the drive apparatuses 14, 62, 72 configured to drive the front wheels 12 is the first drive apparatus while the drive apparatus 18 configured to drive the rear wheels 16 is the second drive apparatus. However, each of the drive apparatuses 14, 62, 72 configured to drive the front wheels 12 may be the second drive apparatus while the drive apparatus 18 configured to drive the rear wheels 16 may be the first drive apparatus. Further, each of the first drive apparatuses 14, 62, 72 may be disposed in a rear portion of the vehicle so as to drive the rear wheels 16r, 16l, while the second drive apparatus 18 may be disposed in a front portion of the vehicle so as to drive the front wheels 12r, 12l.

While the preferred embodiments of this invention have been described in detail by reference to the drawings, it is to be understood that the embodiments described above are given for illustrative purpose only, and that the present invention may be embodied with various modifications and improvements which may occur to those skilled in the art.

NOMENCLATURE OF ELEMENTS

10; 60; 70: vehicle
12r, 12l: front wheels
14: first drive apparatus (one of the first and second drive apparatuses)
16r, 16l: rear wheels 18: second drive apparatus (the other of the first and second drive apparatuses)
20; 64: engine (first motor)
22: motor generator (first motor, electric motor)
24: first transaxle
26r, 26l: drive shafts (weakest part of the one of the first and second drive apparatuses)
28; 68; 76: first drive-force transmission path
30: motor generator (second motor, electric motor)
34r, 34l: drive shafts (weakest part of the other of the first and second drive apparatuses)
36: second drive-force transmission path
40: electronic control apparatus (drive-force control apparatus)
46: wave-like-road running detection portion
48: share-ratio change portion
62; 72: first drive apparatus (one of the first and second drive apparatuses)
74: motor generator (first motor, electric motor)

What is claimed is:

1. A drive-force control apparatus for vehicle of front/rear wheel independent drive type that includes a first drive apparatus, a second drive apparatus, a first pair of wheels and a second pair of wheels, wherein the first drive apparatus includes at least one first motor and is configured to drive the first pair of wheels by the at least one first motor through a first drive-force transmission path defined in the first drive apparatus, and wherein the second drive apparatus includes at least one second motor and is configured to drive the second pair of wheels by the at least one second motor through a second drive-force transmission path defined in the second drive apparatus, each of the first pair of wheels being one of front and rear wheels of the vehicle, each of the second pair of wheels being the other of the front and rear wheels,
the drive-force control apparatus comprising:
a wave-like-road running detection portion configured to detect running of the vehicle on a wave-like road; and
a share-ratio change portion configured, when the running of the vehicle on the wave-like road is detected by the wave-like-road running detection portion, to reduce a drive-force share ratio of one of the first and second drive apparatuses, and to increase a drive-force share ratio of the other of the first and second drive apparatuses, the one of the first and second drive apparatuses including a weakest part that is to be damaged the most easily among parts composing the first and second drive apparatuses, by resonance caused by the running of the vehicle on the wave-like road.

2. The drive-force control apparatus according to claim 1, wherein the share-ratio change portion is configured, when changing the drive-force share ratio of the first drive apparatus, to change a torque of the at least one first motor included in the first drive apparatus, and is configured, when changing the drive-force share ratio of the second drive apparatus, to change a torque of the at least one second motor included in the second drive apparatus.

3. The drive-force control apparatus according to claim 1, wherein the share-ratio change portion is configured, when increasing the drive-force share ratio of the other of the first and second drive apparatuses, to limit increase of the drive-force share ratio of the other of the first and second drive apparatuses, such that damage of a weakest part that is to be damaged the most easily among parts composing the other of the first and second drive apparatuses, by the resonance, is suppressed.

4. The drive-force control apparatus according to claim 1, wherein the at least one first motor of the first drive apparatus includes an engine,
wherein the first drive-force transmission path includes a part constituted by a first transaxle that is configured to distribute an output of the engine to right and left wheels as the first pair of wheels,
wherein the at least one second motor of the second drive apparatus consists of an electric motor, and
wherein the second drive-force transmission path includes a part constituted by a second transaxle that is configured to distribute an output of the electric motor to right and left wheels as the second pair of wheels.

5. The drive-force control apparatus according to claim 4, wherein the at least one first motor of the first drive apparatus includes an electric motor in addition to the engine, and
wherein the first transaxle is configured to distribute, to the right and left wheels, an output of the electric motor in addition to the output of the engine.

6. The drive-force control apparatus according to claim 1, wherein the at least one first motor of the first drive apparatus consists of an electric motor,
wherein the first drive-force transmission path includes a part constituted by a first transaxle that is configured to distribute an output of the electric motor to right and left wheels as the first pair of wheels,
wherein the at least one second motor of the second drive apparatus consists of an electric motor, and
wherein the second drive-force transmission path includes a part constituted by a second transaxle that is configured to distribute an output of the electric motor to right and left wheels as the second pair of wheels.

* * * * *